(12) United States Patent
Griffin et al.

(10) Patent No.: US 7,705,828 B2
(45) Date of Patent: *Apr. 27, 2010

(54) DUAL-MODE MOBILE COMMUNICATION DEVICE

(75) Inventors: Jason T. Griffin, Waterloo (CA); Mihal Lazaridis, Waterloo (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/976,536

(22) Filed: Oct. 12, 2001

(65) Prior Publication Data

US 2002/0044136 A1  Apr. 18, 2002

(51) Int. Cl.
*G06F 3/02* (2006.01)

(52) U.S. Cl. .................... 345/168; 345/169; 341/21; 455/556.1

(58) Field of Classification Search ......... 345/168–169, 345/184, 905; D14/247, 252; 400/489; 455/456, 90, 351, 66, 344, 556, 566, 66.1, 455/90.3, 456.1, 556.1; 379/428, 447, 433; 341/21–23
See application file for complete search history.

(56) References Cited

U.S. PATENT DOCUMENTS

| | | | |
|---|---|---|---|
| 4,029,915 A | 6/1977 | Ojima | |
| 4,449,839 A | 5/1984 | Bleuer | |
| 5,059,048 A | 10/1991 | Sirkin | |
| 5,288,158 A | 2/1994 | Matias | |
| 5,336,001 A * | 8/1994 | Lichtenberg | 400/489 |
| 5,337,346 A * | 8/1994 | Uchikura | 455/556.2 |
| 5,360,280 A | 11/1994 | Camacho et al. | |
| 5,410,333 A | 4/1995 | Conway | |
| 5,416,730 A * | 5/1995 | Lookofsky | 361/680 |
| D367,043 S | 2/1996 | Ross et al. | |
| 5,543,787 A | 8/1996 | Karidis et al. | |
| 5,563,631 A | 10/1996 | Masunaga | |
| 5,575,576 A | 11/1996 | Roysden, Jr. | |

(Continued)

FOREIGN PATENT DOCUMENTS

EP  0267801  5/1988

(Continued)

OTHER PUBLICATIONS

Anonymous: Triangular Toggle Keys for Touch-Tone Phones; IBM Technical Disclosure Bulletin, vol. 31, No. 1, Jun. 1, 1988, pp. 47-49, New York, US.

*Primary Examiner*—Richard Hjerpe
*Assistant Examiner*—Kimnhung Nguyen

(57) ABSTRACT

A dual-mode mobile communication device is provided including a device housing having a front surface, a rear surface and a plurality of side surfaces coupling the front surface to the rear surface. The dual-mode device includes a transceiver for sending and receiving voice and data communications is integrated into the device housing, a display, mounted within the front surface of the device housing, for displaying information to a user of the device regarding voice and data communications, a QWERTY keyboard mounted below the display and within the front surface of the device housing, for generating data communications, and a microphone and a speaker for generating voice communications, wherein the microphone is mounted below the display within the front surface of the device housing and the speaker is mounted above the display within the front surface of the device housing.

59 Claims, 7 Drawing Sheets

U.S. PATENT DOCUMENTS

| | | | |
|---|---|---|---|
| 5,600,790 A | 2/1997 | Barnstijn et al. | |
| 5,659,307 A | 8/1997 | Karidis et al. | |
| 5,661,605 A | 8/1997 | Conway | |
| 5,689,253 A | 11/1997 | Hargreaves et al. | |
| 5,786,776 A | 7/1998 | Kisaichi et al. | |
| 5,797,089 A * | 8/1998 | Nguyen | 455/403 |
| 5,827,082 A | 10/1998 | Laine | |
| 5,861,821 A | 1/1999 | Kato et al. | |
| 5,930,703 A * | 7/1999 | Cairns | 455/418 |
| D416,256 S | 11/1999 | Griffin et al. | |
| 6,005,496 A | 12/1999 | Hargreaves et al. | |
| 6,009,333 A * | 12/1999 | Chaco | 455/456.5 |
| 6,014,573 A | 1/2000 | Lehtonen et al. | |
| 6,018,651 A * | 1/2000 | Bruckert et al. | 455/277.1 |
| 6,046,730 A * | 4/2000 | Bowen et al. | 345/168 |
| 6,046,732 A * | 4/2000 | Nishimoto | 345/168 |
| 6,047,196 A | 4/2000 | Makela et al. | |
| 6,047,197 A * | 4/2000 | Jarrad | 455/566 |
| 6,049,796 A * | 4/2000 | Siitonen et al. | 707/3 |
| 6,084,576 A | 7/2000 | Leu et al. | |
| 6,091,956 A | 7/2000 | Hollenberg | |
| 6,097,964 A * | 8/2000 | Nuovo et al. | 455/566 |
| D433,460 S | 11/2000 | Griffin et al. | |
| 6,278,442 B1 * | 8/2001 | Griffin et al. | 345/169 |
| 6,295,052 B1 | 9/2001 | Kato et al. | |
| 6,304,261 B1 | 10/2001 | Shields et al. | |
| 6,304,431 B1 | 10/2001 | Kim | |
| 6,310,609 B1 | 10/2001 | Morgenthaler | |
| 6,356,258 B1 | 3/2002 | Kato et al. | |
| 6,374,277 B2 | 4/2002 | Vong et al. | |
| 6,385,463 B1 | 5/2002 | Lieberman et al. | |
| 6,396,482 B1 | 5/2002 | Griffin et al. | |
| D460,493 S | 7/2002 | Griffin et al. | |
| D461,803 S | 8/2002 | Griffin et al. | |
| 6,452,588 B2 * | 9/2002 | Griffin et al. | 345/169 |
| D464,995 S | 10/2002 | Griffin et al. | |
| 6,459,968 B1 | 10/2002 | Kochie | |
| 6,489,950 B1 * | 12/2002 | Griffin et al. | 345/168 |
| 6,507,336 B1 | 1/2003 | Lunsford | |
| D472,225 S | 3/2003 | Griffin | |
| 6,535,749 B1 * | 3/2003 | Iwata et al. | 455/556.2 |
| 6,538,651 B1 | 3/2003 | Haymann et al. | |
| D472,551 S | 4/2003 | Griffin | |
| D473,226 S | 4/2003 | Griffin | |
| D476,985 S | 7/2003 | Griffin | |
| D478,585 S | 8/2003 | Griffin | |
| 6,611,254 B1 | 8/2003 | Griffin et al. | |
| D479,233 S | 9/2003 | Griffin | |
| D480,722 S | 10/2003 | Griffin | |
| 6,630,924 B1 | 10/2003 | Peck | |
| 6,647,367 B2 | 11/2003 | McArthur et al. | |
| 6,731,227 B2 * | 5/2004 | Horie | 341/22 |
| 6,744,890 B1 * | 6/2004 | Le et al. | 379/433.07 |
| 2001/0044828 A1 | 11/2001 | Kikinis | |

FOREIGN PATENT DOCUMENTS

| | | | |
|---|---|---|---|
| EP | 0278169 | | 8/1988 |
| EP | 0538020 | | 4/1993 |
| EP | 0685801 | | 12/1995 |
| EP | 0732646 | | 9/1996 |
| EP | 1143327 | | 10/2001 |
| WO | WO 96/04618 | * | 2/1996 |
| WO | 9833111 | | 7/1998 |
| WO | 0038041 | | 6/2000 |
| WO | 0074240 | | 12/2000 |
| WO | 0150335 | | 7/2001 |

* cited by examiner

DUAL-MODE MOBILE COMMUNICATION DEVICE

FIELD OF THE INVENTION

This application relates generally to mobile devices. More specifically, the application relates to a dual-mode mobile communication device for providing voice and data communications.

DESCRIPTION OF THE RELATED ART

Mobile devices are known. Example mobile devices include cellular telephones, personal digital assistants ("PDAs"), wireless data devices like two-way pagers, voice/data communicators, etc. Recently, many companies have attempted to provide a mobile device that serves a variety of communication and organisational needs, such as data communication, voice communication or PDA functionality. For example, companies that primarily manufacture cellular telephones for voice communication, such as Nokia and Ericsson have integrated PDA functionality into their products. Firms that primarily manufacture PDA devices, such as Palm and Handspring, have integrated a wireless data modem into their products to provide data communication. And firms that primarily manufacture wireless data devices, such as Motorola and Research In Motion, have combined the functionality of a wireless data device, such as a two-way pager, with PDA functions.

None of these known devices, however, have successfully provided the full range of data, voice and organisational needs common to today's mobile device users. A primary reason for this failure has been the lack of a single, integrated and well-packaged mobile device that is capable of providing both voice and data communications, and which may also be configured to provide PDA functionality. Some known designs require movement of device housing sections between closed and open positions in order to use voice or data communication functions, and sometimes other on-device functions such as PDA functions. For example, a known so-called "clamshell" design necessitates movement of two hinged housing sections, on which a display, keypad, speaker and microphone are mounted, to operate the device. In a closed position, the housing sections cover one or more of the display, keypad, speaker and microphone, such that one or more device functions cannot be used without first moving the device housing sections relative to each other to expose certain components. Such designs with movable housing sections can not only be inconvenient for a user, difficult to manufacture and prone to breakage of the movable parts, but can also require complicated and often unreliable connections between the parts.

Other designs may provide a static housing, but require substantial re-orientation of the device to switch between voice communications and other device functions. Devices according to a further known substantially rectangular design are intended to be used in one orientation for voice communication functions and in a rotated orientation for other functions. In such devices, a speaker and microphone are positioned at the opposite shorter ends of the rectangular device with a display and keyboard positioned therebetween. In order to accommodate a larger keyboard than a traditional 12-key telephone keypad however, the keyboard is positioned "sideways" on the device. Thus, for voice communications, the short end at which the speaker is mounted is the "top" of the device, whereas for other functions requiring keyboard input, the device must be held to orient a longer side of the device as its "top". Devices requiring reorientation to use different functions can be both inconvenient and confusing when a user attempts to quickly switch between functions.

SUMMARY

A handheld dual-mode mobile communication device is provided including a device housing having a front surface, a rear surface and a plurality of side surfaces coupling the front surface to the rear surface. The dual-mode device includes a transceiver, a display mounted within the front surface of the device housing, a QWERTY keyboard mounted below the display and within the front surface of the device housing, and a microphone and a speaker. The microphone is mounted below the display within the front surface of the device housing and the speaker is mounted above the display within the front surface of the device housing.

According to a further aspect of the invention, mobile communicator for voice and data communication comprises a device housing having a plurality of surfaces. The communicator also includes a display mounted within a first surface of the plurality of surfaces, a QWERTY keyboard mounted adjacent to the display and within the first surface, and a microphone and a speaker, wherein the microphone is mounted within the first surface and the speaker is mounted within the first surface, and wherein the first surface has apertures therein to expose at least a portion of the display, QWERTY keyboard, microphone and speaker.

In a further embodiment, a dual-mode mobile communication device is provided, comprising a device housing having a front surface, a rear surface and a plurality of side surfaces coupling the front surface to the rear surface, a transceiver for sending and receiving voice and data communications, a display, mounted within the front surface of the device housing, for displaying information to a user of the device regarding voice and data communications, a QWERTY keyboard mounted below the display and within the front surface of the device housing, for generating data communications, and a microphone and a speaker for generating voice communications. The microphone is mounted below the display within the front surface of the device housing and the speaker is mounted above the display within the front surface of the device housing.

A handheld mobile communication device assembly is also provided, comprising a first device housing section, a second device housing section, and a printed circuit board (PCB), wherein the first and second device housing sections cooperate to couple together to form a handheld mobile communication device housing enclosing the PCB therein. The device housing includes a plurality of apertures at least partially exposing a display mounted on the PCB, a QWERTY keyboard mounted on the PCB, and a microphone and a speaker.

DETAILED DESCRIPTION OF THE DRAWINGS

Figure 1:
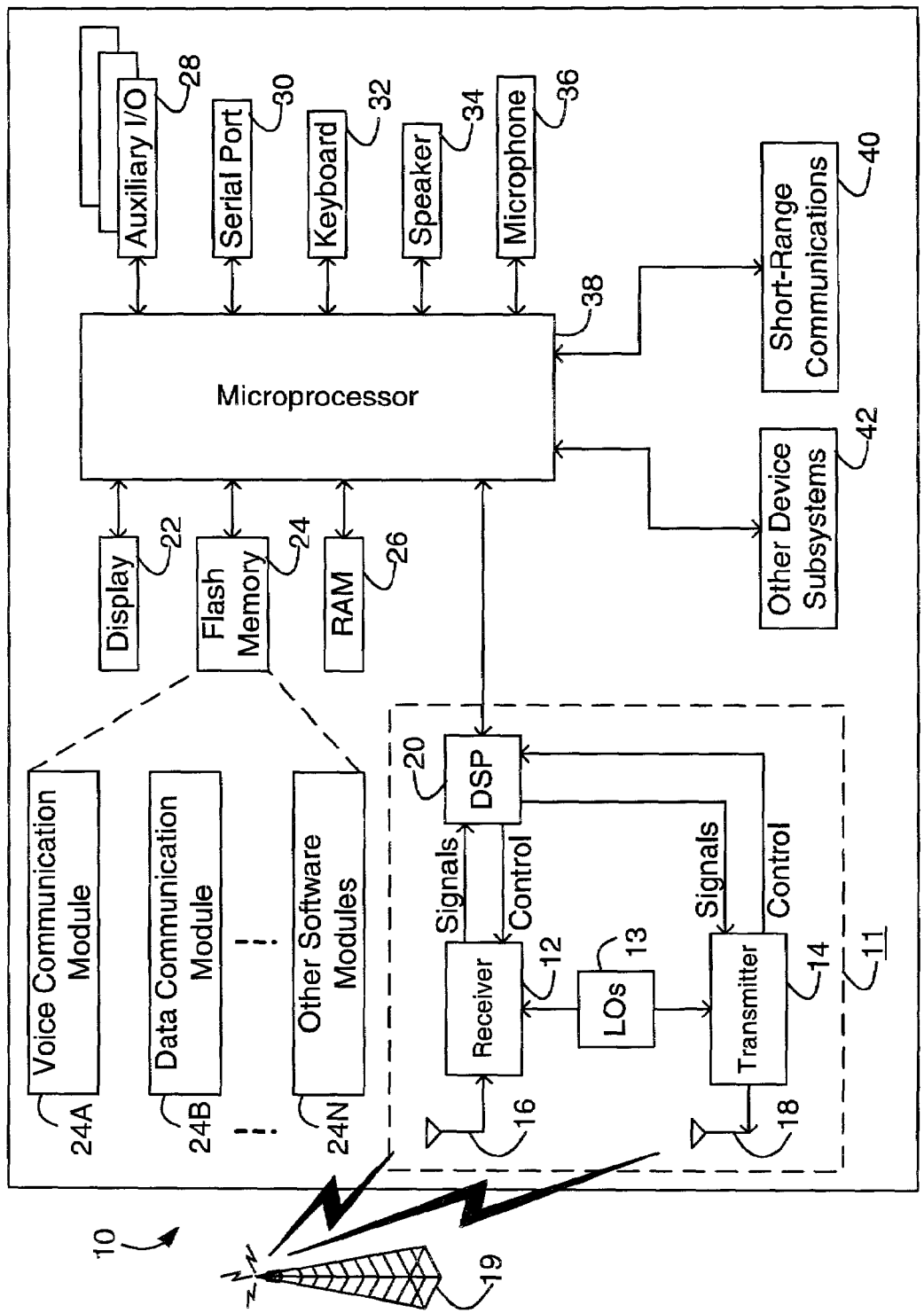
FIG. 1 is a block diagram of a dual-mode mobile communication device.

Turning now to the drawing figures, FIG. 1 is a block diagram of a dual-mode mobile communication device 10. The dual-mode device 10 includes a transceiver 11, a microprocessor 38, a display 22, Flash memory 24, RAM memory 26, auxiliary input/output (I/O) devices 28, a serial port 30, a keyboard 32, a speaker 34, a microphone 36, a short-range wireless communications sub-system 40, and may also include other device sub-systems 42. The transceiver 11 preferably includes transmit and receive antennas 16, 18, a receiver 12, a transmitter 14, one or more local oscillators 13, and a digital signal processor 20. Within the Flash memory 24, the device 10 preferably includes a plurality of software modules 24A-24N that can be executed by the microprocessor 38 (and/or the DSP 20), including a voice communication module 24A, a data communication module 24B, and a plurality of other operational modules 24N for carrying out a plurality of other functions.

The mobile communication device 10 is preferably a two-way communication device having voice and data communication capabilities. Thus, for example, the device may communicate over a voice network, such as any of the analog or digital cellular networks, and may also communicate over a data network. The voice and data networks are depicted in FIG. 1 by the communication tower 19. These voice and data networks may be separate communication networks using separate infrastructure, such as base stations, network controllers, etc., or they may be integrated into a single wireless network.

The communication subsystem 11 is used to communicate with the voice and data network 19, and includes the receiver 12, the transmitter 14, the one or more local oscillators 13 and may also include the DSP 20. The DSP 20 is used to send and receive signals to and from the transmitter 14 and receiver 12, and is also utilized to receive control information from the transmitter 14 and to provide control information to the receiver 12. If the voice and data communications occur at a single frequency, or closely-spaced set of frequencies, then a single local oscillator 13 may be used in conjunction with the transmitter 14 and receiver 12. Alternatively, if different frequencies are utilized for voice communications versus data communications, then a plurality of local oscillators 13 can be used to generate a plurality of frequencies corresponding to the voice and data networks 19. Although two antennas 16, 18 are depicted in FIG. 1, the mobile device 10 could be used with a single antenna structure. Information, which includes both voice and data information, is communicated to and from the communication module 11 via a link between the DSP 20 and the microprocessor 38. The detailed design of the communication subsystem 11, such as frequency band, component selection, power level, etc., will be dependent upon the communication network 19 in which the device is intended to operate. For example, a device 10 intended to operate in a North American market may include a communication subsystem 11 designed to operate with the Mobitex™ or DataTAC™ mobile data communication networks and also designed to operated with any of a variety of voice communication networks, such as AMPS, TDMA, CDMA, PCS, etc., whereas a device 10 intended for use in Europe may be configured to operate with the General Packet Radio Service (GPRS) data communication network and the GSM voice communication network. Other types of data and voice networks, both separate and integrated, may also be utilized with the mobile device 10.

Depending upon the type of network 19 (or networks), the access requirements for the dual-mode mobile device 10 may also vary. For example, in the Mobitex and DataTAC data networks, mobile devices are registered on the network using a unique identification number associated with each device. In GPRS data networks, however, network access is associated with a subscriber or user of a device 10. A GPRS device typically requires a subscriber identity module ("SIM"), which is required in order to operate the device 10 on a GPRS network. Local or non-network communication functions (if any) may be operable, without the SIM device, but the device 10 will be unable to carry out any functions involving communications over the data network 19, other than any legally required operations, such as 911 emergency calling.

After any required network registration or activation procedures have been completed, the dual-mode device 10 may the send and receive communication signals, including both voice and data signals, over the network 19 (or networks). Signals received by the antenna 16 from the communication network 19 are routed to the receiver 12, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 20. In a similar manner, signals to be transmitted to the network 19 are processed, including modulation and encoding, for example, by the DSP 20 and are then provided to the transmitter 14 for digital to analog conversion, frequency up conversion, filtering, amplification and transmission to the communication network 19 (or networks) via the antenna 18. Although a single transceiver 11 is shown in FIG. 1 for both voice and data communications, it is possible that the device 10 may include two distinct transceivers, a first transceiver for transmitting and receiving voice signals, and a second transceiver for transmitting and receiving data signals.

In addition to processing the communication signals, the DSP 20 also provides for receiver and transmitter control. For example, the gain levels applied to communication signals in the receiver 12 and transmitter 14 may be adaptively controlled through automatic gain control algorithms implemented in the DSP 20. Other transceiver control algorithms could also be implemented in the DSP 20 in order to provide more sophisticated control of the transceiver 11.

The microprocessor 38 preferably manages and controls the overall operation of the dual-mode mobile device 10. Many types of microprocessors or microcontrollers could be used here, or, alternatively, a single DSP 20 could be used to carry out the functions of the microprocessor 38. Low-level communication functions, including at least data and voice communications, are performed through the DSP 20 in the transceiver 11. Other, high-level communication applications, such as a voice communication application 24A, and a data communication application 24B may be stored in the Flash memory 24 for execution by the microprocessor 38. For example, the voice communication module 24A may provide a high-level user interface operable to transmit and receive voice calls between the dual-mode mobile device 10 and a plurality of other voice devices via the network 19. Similarly, the data communication module 24B may provide a high-level user interface operable for sending and receiving data, such as e-mail messages, files, organizer information, short text messages, etc., between the dual-mode mobile device 10 and a plurality of other data devices via the network 19.

The microprocessor 38 also interacts with other device subsystems, such as the display 22, Flash memory 24, random access memory (RAM) 26, auxiliary input/output (I/O) subsystems 28, serial port 30, keyboard 32, speaker 34, microphone 36, a short-range communications subsystem 40 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 may be used for both communication-related functions, such as entering a text message for transmission over a data communication network, and device-resident functions such as a calculator or task list or other PDA type functions.

Operating system software used by the microprocessor 38 is preferably stored in a persistent store such as Flash memory 24. In addition to the operation system, which controls all of the low-level functions of the device 10, the Flash memory 24 may include a plurality of high-level software application programs, or modules, such as a voice communication module 24A, a data communication module 24B, an organizer module (not shown), or any other type of software module 24N. The Flash memory 24 also may include a file system for storing data. These modules are executed by the microprocessor 38 and provide a high-level interface between a user of the device and the device. This interface typically includes a graphical component provided through the display 22, and an input/output component provided through the auxiliary I/O 28, keyboard 32, speaker 34, and microphone 36. The operating system, specific device applications or modules, or parts thereof, may be temporarily loaded into a volatile store, such as RAM 26 for faster operation. Moreover, received communication signals may also be temporarily stored to RAM 26, before permanently writing them to a file system located in the persistent store 24.

An exemplary application module 24N that may be loaded onto the dual-mode device 10 is a personal information manager (PIM) application providing PDA functionality, such as calendar events, appointments, and task items. This module 24N may also interact with the voice communication module 24A for managing phone calls, voice mails, etc., and may also interact with the data communication module for managing e-mail communications and other data transmissions. Alternatively, all of the functionality of the voice communication module 24A and the data communication module 24B may be integrated into the PIM module.

The Flash memory 24 preferably provides a file system to facilitate storage of PIM data items on the device. The PIM application preferably includes the ability to send and receive data items, either by itself, or in conjunction with the voice and data communication modules 24A, 24B, via the wireless network 19. The PIM data items are preferably seamlessly integrated, synchronized and updated, via the wireless network 19, with a corresponding set of data items stored or associated with a host computer system, thereby creating a mirrored system for data items associated with a particular user.

The mobile device 10 may also be manually synchronized with a host system by placing the device 10 in an interface cradle, which couples the serial port 30 of the mobile device 10 to the serial port of the host system. The serial port 30 may also be used to enable a user to set preferences through an external device or software application, or to download other application modules 24N for installation. This wired download path may be used to load an encryption key onto the device, which is a more secure method than exchanging encryption information via the wireless network 19.

Additional application modules 24N may be loaded onto the dual-mode device 10 through the network 19, through an auxiliary I/O subsystem 28, through the serial port 30, through the short-range communications subsystem 40, or through any other suitable subsystem 42, and installed by a user in the Flash memory 24 or RAM 26. Such flexibility in application installation increases the functionality of the device 10 and may provide enhanced on-device functions, communication-related functions, or both. For example, secure communication applications may enable electronic commerce functions and other such financial transactions to be performed using the device 10.

When the dual-mode device 10 is operating in a data communication mode, a received signal, such as a text message or a web page download, will be processed by the transceiver 11 and provided to the microprocessor 38, which will preferably further process the received signal for output to the display 22, or, alternatively, to an auxiliary I/O device 28. A user of dual-mode device 10 may also compose data items, such as email messages, using the keyboard 32, which is preferably a complete alphanumeric keyboard laid out in the QWERTY style, although other styles of complete alphanumeric keyboards such as the known DVORAK style may also be used. User input to the device 10 is further enhanced with a plurality of auxiliary I/O devices 28, which may include a thumbwheel input device, a touchpad, a variety of switches, a rocker input switch, etc. The composed data items input by the user may then be transmitted over the communication network 19 via the transceiver 11.

When the dual-mode device 10 is operating in a voice communication mode, the overall operation of the device 10 is substantially similar to the data mode, except that received signals are preferably be output to the speaker 34 and voice signals for transmission are generated by a microphone 36. Alternative voice or audio I/O subsystems, such as a voice message recording subsystem, may also be implemented on the device 10. Although voice or audio signal output is preferably accomplished primarily through the speaker 34, the display 22 may also be used to provide an indication of the identity of a calling party, the duration of a voice call, or other voice call related information. For example, the microprocessor 38, in conjunction with the voice communication module and the operating system software, may detect the caller identification information of an incoming voice call and display it on the display 22.

A short-range communications subsystem 40 may also be included in the dual-mode device 10. For example, the subsystem 40 may include an infrared device and associated circuits and components, or a Bluetooth™ short-range wireless communication module to provide for communication with similarly-enabled systems and devices.

Figure 2:
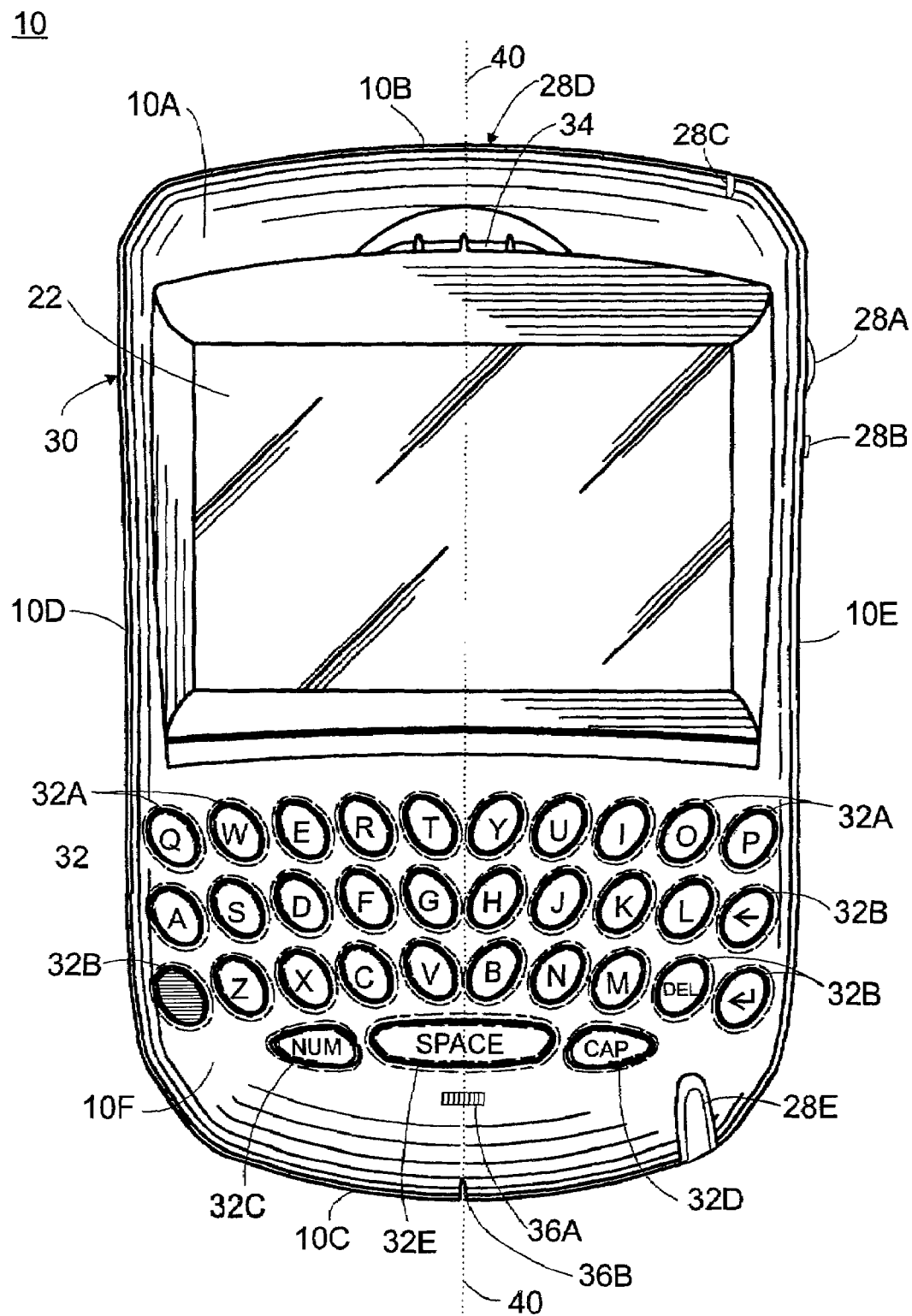
FIG. 2 is a front schematic view of an exemplary dual-mode mobile communication device.

FIG. 2 is a front schematic view of an exemplary dual-mode mobile communication device 10, such as shown in FIG. 1. This device 10 includes a single, integrated device housing 10A having a front surface 10F, a rear surface 10G, and a plurality of side surfaces 10B, 10C, 10D, and 10E. The plurality of side surfaces 10B-10E couple the front surface 10F to the rear surface 10G.

The speaker 34, display 22, keyboard 32 and microphone 36 are preferably mounted within the front surface 10F of the device housing. Preferably, the speaker 34 is positioned above the display 22 near the top surface 10B of the device housing 10A, and approximately in the middle of the front surface 10F equidistant from the two side surfaces, left hand side surface 10D and right hand side surface 10E. However, the speaker 34 may instead be positioned closer to one of the two side surfaces 10D and 10E than the other. Below the speaker 34, an approximately square display 22 is mounted centrally in the front surface 10F. Although a square display 22 is shown in FIG. 2, other geometrical configurations of the display may also be utilised.

The keyboard 32 and microphone 36 are preferably mounted in the front surface 10F below the display 22, and the microphone 36 is preferably positioned below the keyboard 32 at the location 36A near the side surface 10C at the bottom of the device housing 10A, although, alternatively, the microphone 36 may be positioned between the display 22 and the keyboard 32, or at the location designated 36B, on the bottom side surface 10C for example. Both the keyboard 32 and the microphone 36 are preferably positioned centrally in the front surface 10F, in like manner to the display 22 and the speaker 34.

The keyboard 32 preferably comprises a QWERTY style keyboard having a plurality of letter keys 32A. Also included in the keyboard 32 are several function keys 32B, including a backspace key, an enter key, an alternate character key, and a delete key. In addition to these letter keys 32A and function keys 32B, the keyboard 32A preferably comprises a NUM lock key 32C for selecting numbers associated with the letter keys 32A and a CAP lock key 32D for putting the keyboard into a mode where the letter keys 32A provide a capital letter, preferably at each side of a space bar key 32E.

The keyboard 32A is preferably symmetrically positioned from both the side surfaces 10D and 10E, and is centrally mounted within the front surface 10F. The letter keys 32A and function keys 32B of the keyboard are preferably tilted at an angle with respect to a vertical reference line 40 that bisects the front surface 10F. Preferably, about (or exactly) half of the letter keys 32A and function keys 32B are positioned on the left hand side of the front surface 10F, to the left of the vertical reference line 40, and about (or exactly) half of the letter keys 32A and function keys 32B are positioned on the right hand side of the front surface 10F, to the right of the vertical reference line 40.

The letter keys 32A and function keys 32B on the left hand side of the front housing surface 10F are preferably all tilted at a common negative angle with respect to the vertical reference line 40, and the letter keys 32A and function keys 32B on the right hand side of the front surface 10F are preferably all tilted at a common positive angle with respect to the vertical reference line 40. Preferably, the positive and negative angles are complementary, so that, for example, the keys on the left hand side are tilted at about negative 40 degrees and the keys on the right hand side are tilted at about positive 40 degrees. Other angles of inclination of the keys are, of course, possible, and it is also possible that the keys in either the left hand side or right hand side grouping of keys are not all tilted at the same angle, but may be tilted at various angles. Although the keys of the keyboard 32 are preferably arranged in left hand side and right hand side groups, the groups are positioned adjacent each other to form a unitary keyboard structure.

The letter keys 32A and function keys 32B are preferably organised into three rows of keys. Each of the rows of keys spans both the left hand side and right hand side of the front surface 10F. The keys 32A, 32B in each row may be aligned along a horizontal reference line (not shown) perpendicular to the vertical reference line 40, or they may be displaced from each other, preferably in an arc across the front surface 10F. The arc may be either convex or concave such that the keys on the outer positions of the row, such as the "Q" key or the "P" key in the top row of keys are either above or below the horizontal reference line.

Preferably, the keys 32A, 32B are oval-shaped keys, as shown in FIG. 2. The shape of the keys, however, may take other forms, such as generally oblong shaped, which would include any non-symmetrical key such as an oval shaped key, a rectangular shaped key, a diamond shaped key, or some combination of oval, rectangular, circular or diamond shapes. Alternatively, the keys 32A, 32B may be generally symmetrically shaped, such as circular or square.

Figure 3:
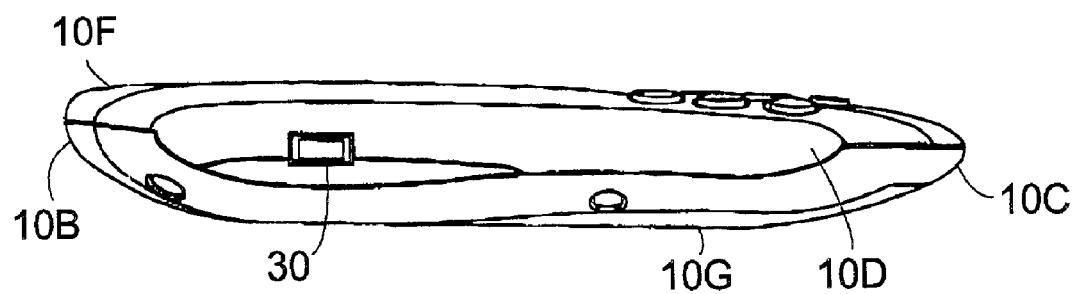
FIG. 3 is a side elevation of the left hand side of the device shown in FIG. 2.
Figure 4:
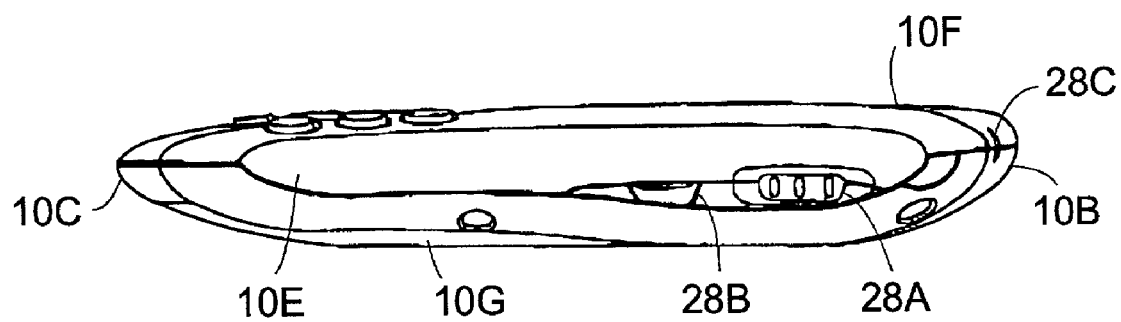
FIG. 4 is a side elevation of the right hand side of the device shown in FIG. 2.
Figure 5:
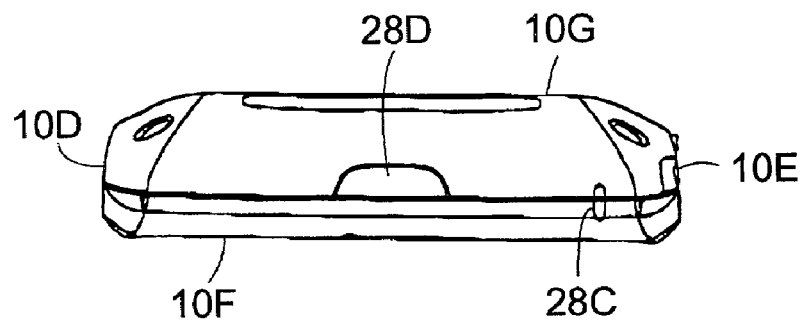
FIG. 5 is top view of the device shown in FIG. 2.

The dual mode mobile device housing 10A also mounts the serial port 30, and the auxiliary I/O devices 28. FIG. 2 shows a device 10 having a serial port 30 mounted in the left hand side surface 10D of the device housing 10A, a plurality of auxiliary I/O devices 28A and 28B mounted in the right hand side surface 10E, a plurality of auxiliary I/O devices 28C and 28D mounted in the top side surface 10B, and an auxiliary input key 28E in the front surface 10F. The positions of the serial port 30 and auxiliary I/O devices 28A, 28B, 28C and 28D are more clearly shown in FIGS. 3 through 5, although the invention is in no way restricted to these particular locations of components 28A through 28D and 30. FIG. 3 is a side elevation of the left hand side of the device shown in FIG. 2, FIG. 4 is a side elevation of the right hand side of the device shown in FIG. 2, and FIG. 5 is top view of the device shown in FIG. 2.

Auxiliary I/O device 28A is a thumbwheel input device and is preferably mounted along the right hand side surface 10E of the device housing 10A immediately adjacent to the display 22. The thumbwheel input device 28A is used to select information on the display screen 22, and is thus optimally positioned adjacent to the display screen 22. Other mounting positions of the thumbwheel input device 28A are also possible, such as on the left side surface 10D, or in the front surface 10F. Auxiliary I/O device 28B is an ESC (Escape) button, and is preferably mounted in the right side surface 10E immediately below the thumbwheel 28A. Auxiliary I/O device 28C, preferably mounted in the top side surface 10B, is an LED (light emitting diode) that indicates certain operational states of the mobile device 10, and auxiliary I/O device 28D is an IrDA (Infrared Data Association) port, also mounted in the top surface 10B, which provides for short range communications between the device 10 and other similarly equipped devices and systems. The auxiliary input key 28E may be a device power key, a backlight key for turning a backlight for the display 22 on and off, a mode key for switching between voice communication, data communication and possibly other device functional modes, for example.

Figure 6:
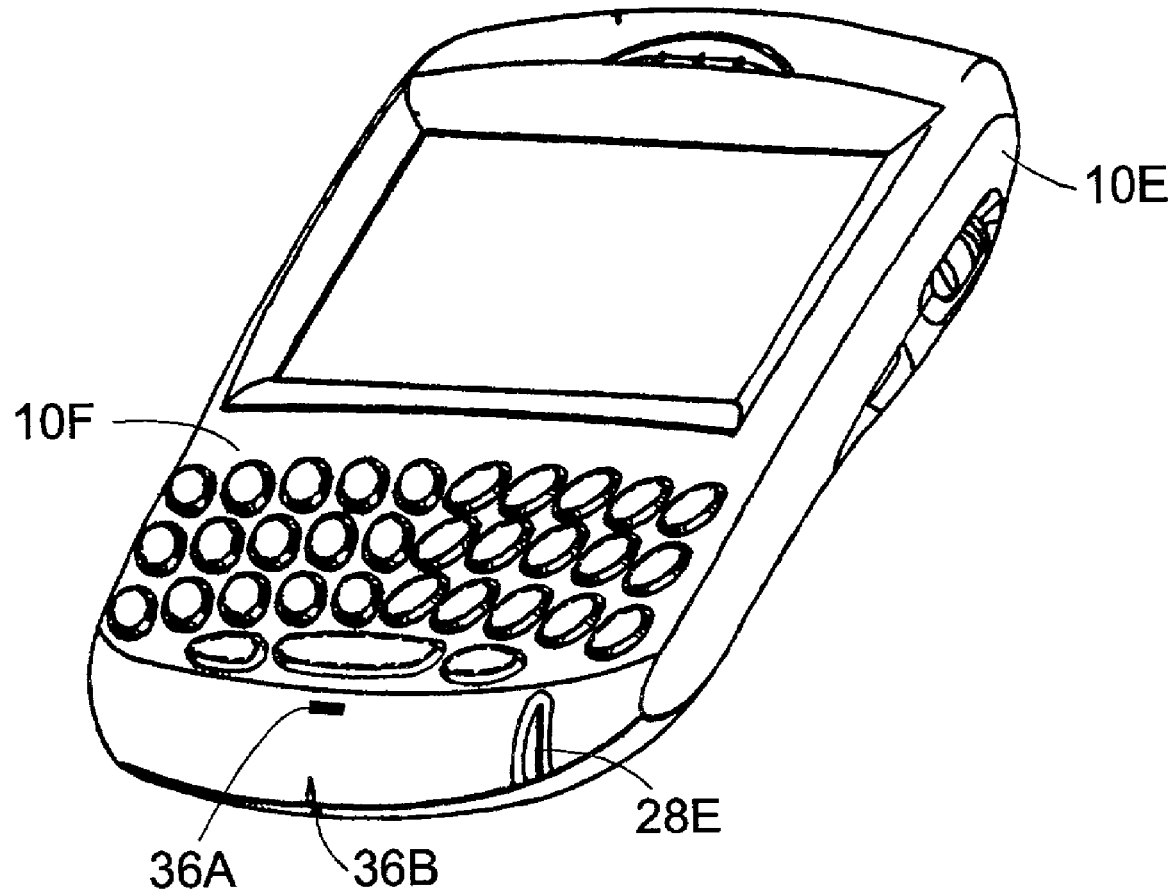
FIG. 6 is a perspective view showing the front, right hand side and bottom of the exemplary mobile communication device shown in FIG. 2.

FIG. 6 is a perspective view showing the front, right hand side and bottom of the exemplary mobile communication device shown in FIG. 2. As shown clearly in FIG. 6, the microphone 36 is preferably mounted near the bottom of the front surface 10F of the device housing 10A, adjacent to the bottom side surface 10D, at location 36A, or alternatively on the bottom side surface 10D, at location 36B.

A primary advantage of the device shown in FIGS. 1 and 2 is that it provides a dual-mode device capable of voice communication, data communication and PDA functions in a single, integrated housing in which the voice communication interface (such as the speaker 34, microphone 36, and display 22) and the data communication interface (such as the display 22 and keyboard 32) are mounted in a single device housing 10A, and, more particularly, in a front surface 10F of the device housing 10A and aligned so that the speaker is at or near the top of the front surface 10F, the display 22 is below the speaker 34, and the keyboard 32 and microphone 36 are positioned below the display 22. In a device having a substantially rectangular shape as shown in FIGS. 2 though 6, the speaker 34, display 22, keyboard 32 and microphone 36 are preferably aligned along the longer dimension of the device, along or parallel to the vertical line 40, with rows of keys of the keyboard 32 arranged across the shorter dimension of the device, as shown in FIG. 2. For differently shaped devices, these components are preferably similarly aligned along or parallel to a major axis or longer dimension of the device, with the keyboard rows spanning the shorter dimension. This provides the advantage that a user may use all device functions with the device in substantially the same orientation. Whether the device 10 is being used for voice communication, data communication or other functions, the device 10 is oriented with the surface 10B at the top.

Figure 7:
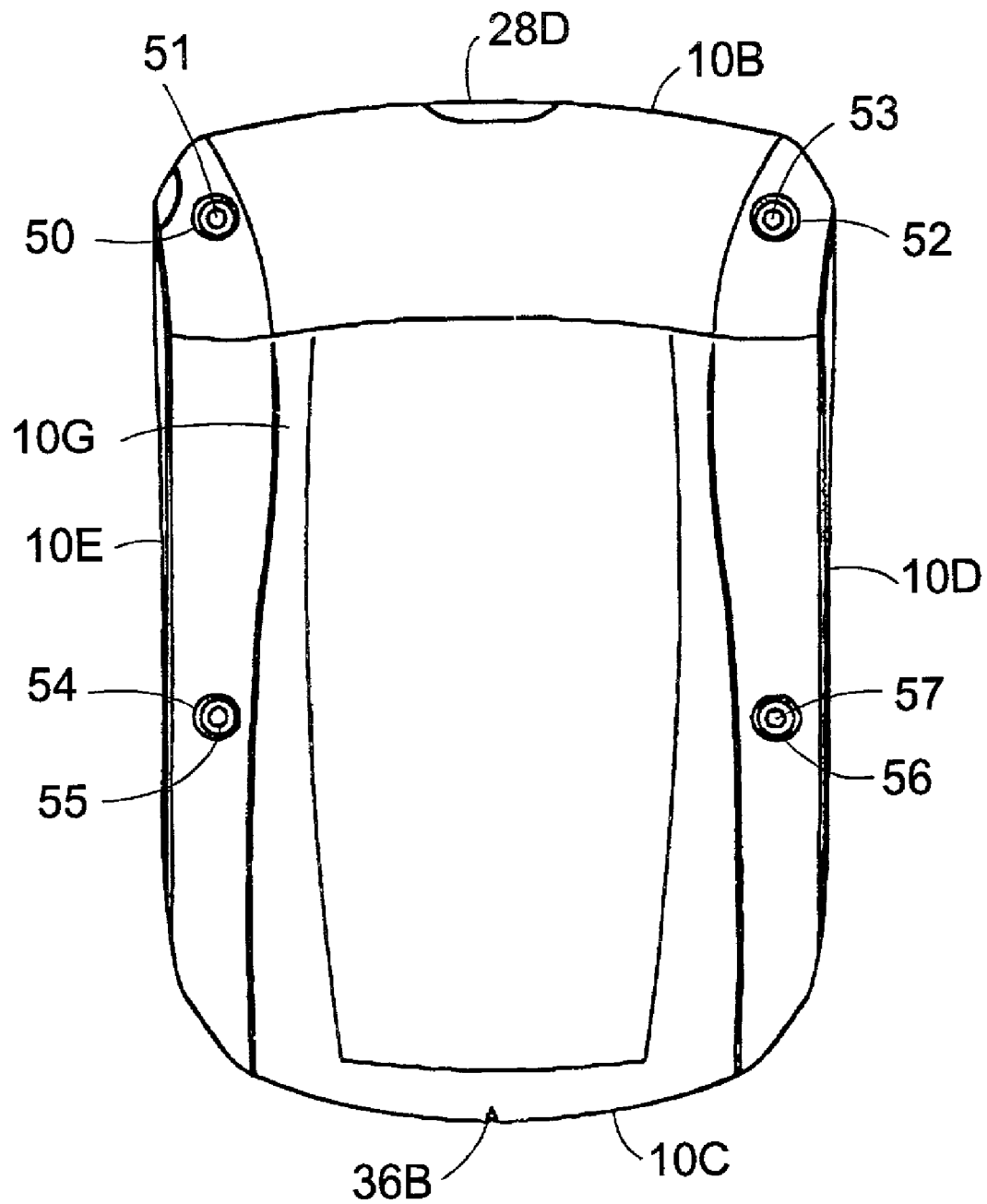
FIG. 7 is a rear view of the device in FIG. 2.
Figure 8:
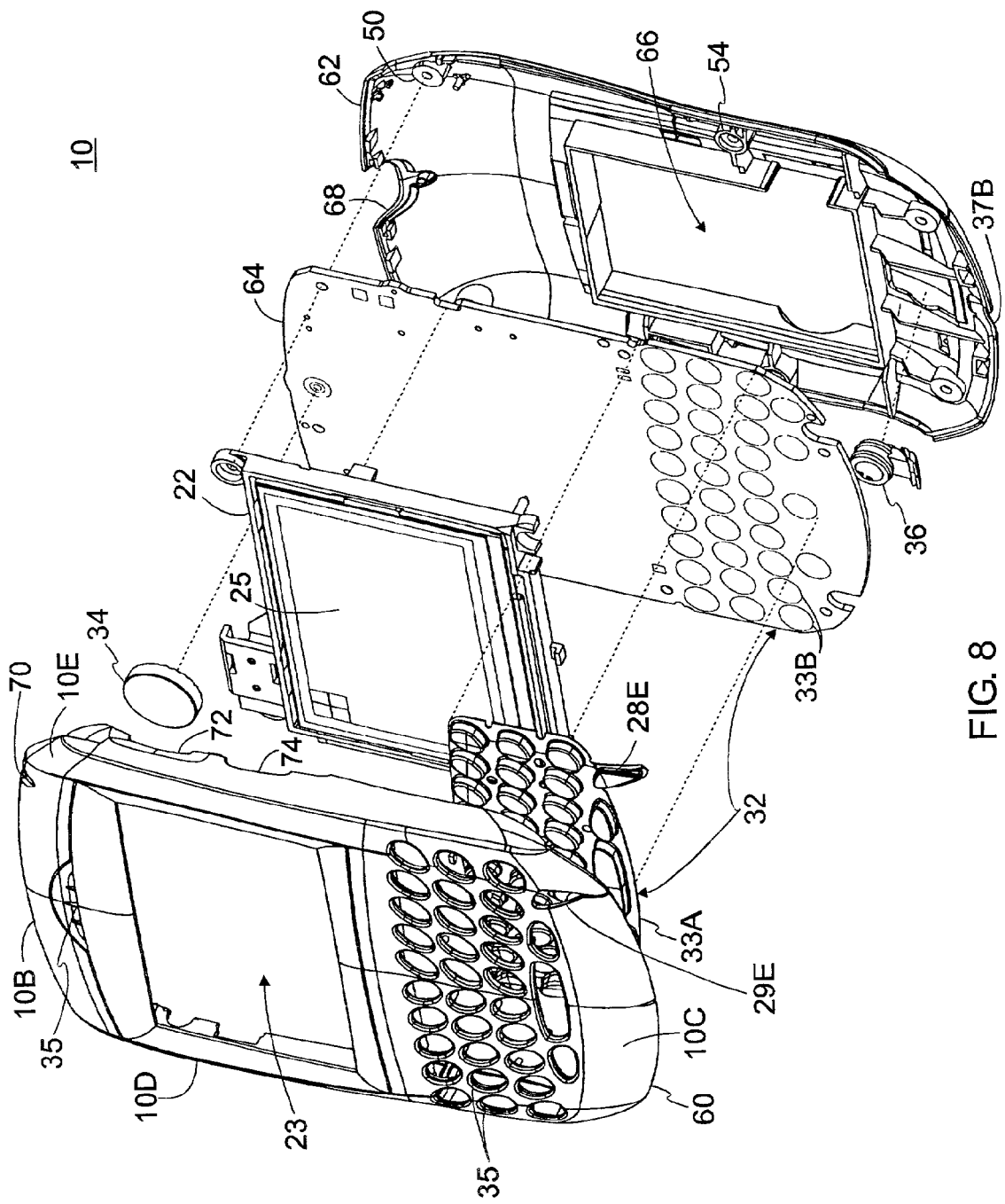
FIG. 8 is an exploded view of the exemplary mobile communication device shown in FIG. 2.

A further significant advantage of the present invention can be appreciated with reference to FIGS. 7 and 8. FIG. 7 is a rear view of the device in FIG. 2, and FIG. 8 is an exploded view of the exemplary mobile communication device shown in FIG. 2.

Referring first to FIG. 7, there are shown a plurality of holes 50, 52, 54 and 56 in which fasteners 51, 53, 55 and 57, such as screws, rivets or the like, are received to couple first and second device housing sections (see FIG. 8) together to form the single integrated device housing 10A which encloses components of the mobile communication device 10 shown in FIG. 1. The first and second device housings and internal device components are shown in further detail in FIG. 8.

FIG. 8 shows a handheld mobile communication device assembly 10 which has a first device housing section 60 and a second device housing section 62 which as described above cooperate to couple together, using fasteners 50, 52, 54, 56 (FIG. 7). It should be appreciated that fasteners are but one example of possible components that may be used to couple the device housing sections together. Other components include flexible or rigid but deformable members, possibly integral with one of the device housing sections, which engage cooperating structures on the other or each device housing section or are deformed to hold the device housing sections together. The device housing sections might also or instead be coupled together by bonding, with adhesive for example. However, the device housing sections are preferably coupled together using releasable fasteners such as screws.

Also shown in FIG. 8 is a PCB (printed circuit board) 64, upon which most of the internal components of the mobile communication device are preferably mounted. The keyboard 32 is preferably formed by positioning a key web 33A over a plurality of switches 33B on the PCB 64. The key web 33A and plurality of switches 33B are preferably configured such that each key in the key web 33A contacts and operates one of the switches 33B when the key is depressed. Other configurations may also be implemented, in which the number of switches 33B may be less than the number of keys on the key web 33A. The key web 33A and switches 33B on PCB 64 are also positioned such that the apertures 35 at least partially expose the keyboard 32. As will be apparent from FIG. 8, portions of the key web 33A will be exposed by the apertures 35 to provide key surfaces that may be depressed by a user of the device 10 to provide data input to the device 10. Such data input may for example be used to generate data communications on the device 10. In the example device 10 shown in FIG. 8, the auxiliary key 28E is adjacent to the keyboard 32, such that the auxiliary key 28E is shown as part of the key web 33A and at least partially exposed by the aperture 29A. However, in alternate embodiments, the auxiliary key 28E or other auxiliary keys (not shown) need not be provided as part of the key web 33A. Such keys may be separate from the key web 33A.

The display 22 is also preferably mounted on the PCB 64, as shown in FIG. 8. When the first device housing section 60 and second device housing section 62 are coupled together, the aperture 23 in the first device housing section 60 at least partially exposes the display 22. For example, the aperture 23 in the first device housing section 60 and the display 22 on the PCB 64 may be positioned such that a viewing area 25 of the display is exposed. The frame and other components associated with the display 22 are preferably hidden from view when the first and second device housing sections 60 and 62 are coupled together.

The speaker 34 is preferably mounted at or near the top of the PCB 64. One or more apertures 35 in the first device housing section 60 are positioned to at least partially expose the speaker 34 when the first and second device housing sections 60 and 62 are coupled together.

In the example assembly shown in FIG. 8, the microphone 36 is mounted in the second device housing section 62, corresponding to the second position 36B shown for example in FIG. 6. The microphone 36 is at least partially exposed by the aperture 37B in the second device housing section, and coupled to the PCB and other device components as shown in FIG. 1. Audio or voice inputs to the microphone 36 may be used for example to generate voice communications. When the microphone 36 is positioned at the location 36A (FIG. 1), an aperture (not shown) would be provided in the first device housing section 60 to at least partially expose the microphone 36, and the microphone 36 would then preferably be mounted in the first device housing section 60 or on the PCB 64.

The device housing sections may include further apertures to expose or partially expose other device components. In the first device housing section 60, apertures 70, 72 and 74 are configured to partially expose the auxiliary I/O devices 28C, 28A and 28B, respectively, not shown in FIG. 8 but shown in FIGS. 4 and 6. The aperture 68 is similarly positioned in the second device housing section 62 to at least partially expose the auxiliary I/O device 28D, shown most clearly in FIG. 5. As described above, the aperture 29A at least partially exposes the auxiliary key 29A. The aperture 66 in the second device housing section 62 may be provided to accommodate a power supply such as a battery. Other apertures may also be provided in the device housing as necessary.

Other internal components of the device 10 may also be mounted on the PCB 64. The device components are interconnected to provide for at least data and voice communication functionality, possibly in addition to further local non-communication functions and short-range communication functions. Although these other internal components are not shown in FIG. 8, most of them are preferably mounted on the other side of the PCB 64, opposite the side on which the keyboard 32, display 22 and speaker 34 are mounted, but some components may be mounted adjacent to the display 22 and/or keyboard 32 or on or along an edge of the PCB 64. The internal components of the device 10 are interconnected as necessary, through wired connections, PCB tracks, other types of connectors or connections, or possibly combinations thereof.

The first and second device housing sections, when coupled together, form a handheld mobile communication device housing enclosing the PCB and internal components therein. The apertures 35, 23, 35 and 37B at least partially expose the speaker 34, display 22, keyboard 32 and microphone 36 as described above. Partial exposure of these components allows a user to make use of these components while at the same time protecting the components from damage. Apertures 29A, 68, 70, 72, 74 similarly expose and protect auxiliary I/O devices. When access to a component will normally be required relatively infrequently, a removable cover element may be provided for a corresponding device housing aperture. In the above example of a device power supply, a cover (not shown) is preferably provided for the aperture 66. Access to the power supply is thereby possible when required, yet the battery remains protected when access thereto is not necessary.

As most clearly shown in FIG. 8, the first device housing section 60 may be considered a first surface having one or more substantially flat portions representing a frontal surface 10F of the housing and one or more curved portions depending from the substantially flat portions of the frontal surface 10F, and representing one or more side surfaces 10B, 10C, 10D and 10E of the housing. In a similar manner, it is also contemplated that such side surfaces may depend from the second device housing section 62. Alternatively, each of the first and second device housing sections 60 and 62 may have one or more substantially flat surfaces respectively representing a frontal surface 10F and a rear surface (not shown in FIG. 8) of the housing and one or more surfaces depending therefrom, such that the depending surface cooperate to form the side surfaces when the first and second device housing sections 60 and 62 are coupled together.

The assembly in FIG. 8 offers significant manufacturing advantages for the device 10. Mounting of most internal device components on a single PCB 64 simplifies manufacture of the PCB in that only a single PCB must be built and positioned in a device housing section. Interconnections between different PCBs and problems associated with accurate relative placement of multiple PCBs are thereby avoided. During manufacture, the PCB 64 may be positioned on or in either the first device housing section 60 or the second device housing section 62. The other device section is then moved into place and the housing sections are coupled together to enclose the PCB and other internal device components in a single integrated device housing. Once assembled, the device housing is static, and device housing sections need not be moved relative to each other to provide for voice and data communication or other functions. Advantageously, breakage of movable device housing sections and typically problematic hinge arrangements and connections are thereby avoided.

Figure 9:
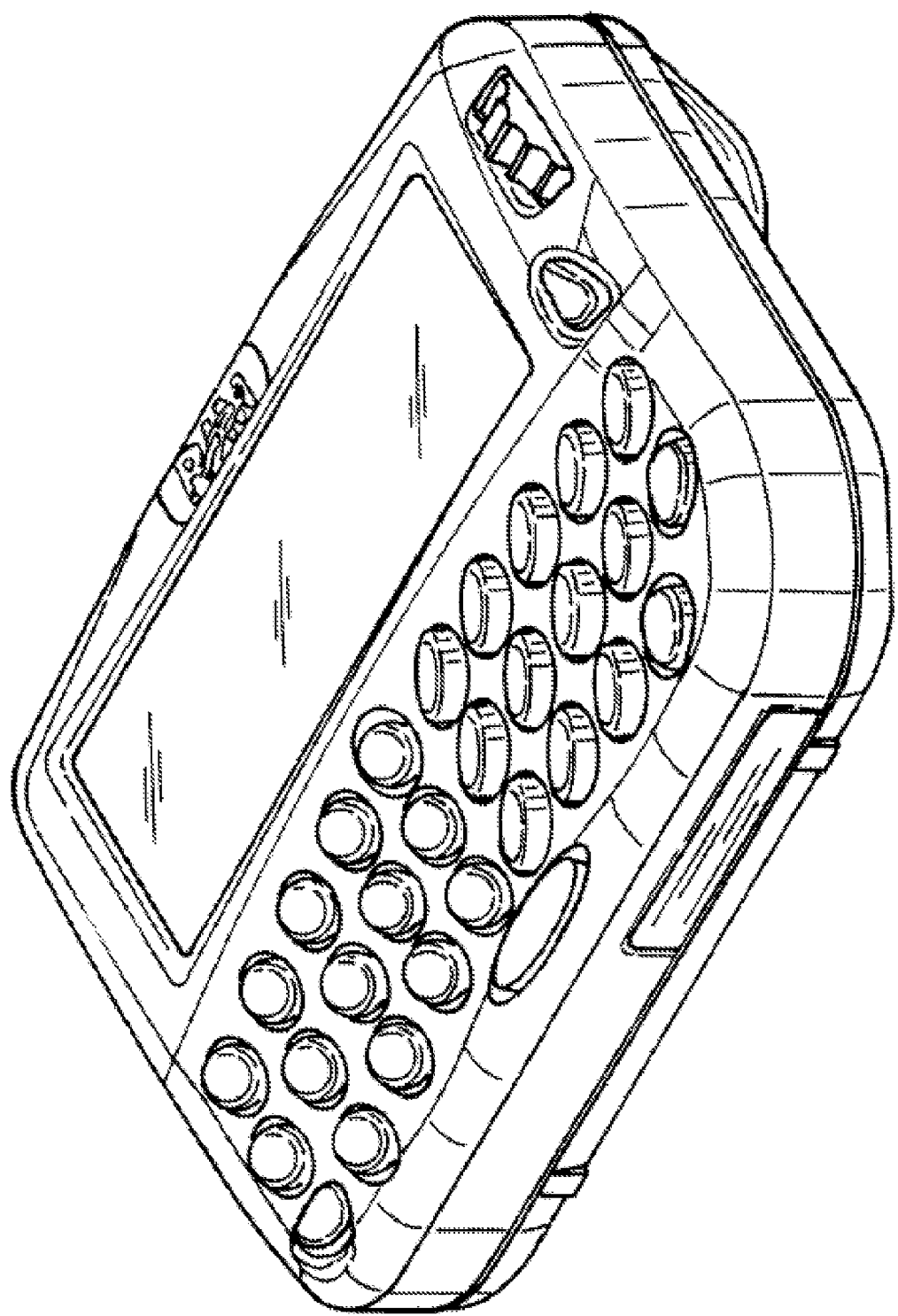
FIG. 9 illustrates a front perspective view of another device with a keyboard of an embodiment of the present invention.

FIG. 9 illustrates a front perspective view of another device with a keyboard of an embodiment of the present invention.

Having described in detail the preferred embodiments of the present invention, including the preferred methods of operation, it is to be understood that this operation could be carried out with different elements and steps. This preferred embodiment is presented only by way of example and is not meant to limit the scope of the present invention, which is defined by the following claims.

We claim:

1. Apparatus for a dual mode mobile communication device useable by a user, said apparatus comprising:
    an integrated device housing having a front surface, a rear surface, a top face surface, and a bottom face surface, said housing having a first dimension and a second dimension, the first dimension defining a major axis, the second dimension defining a minor axis,
    a speaker mounted within said integrated device housing;
    a microphone mounted within said integrated housing;
    a display mounted within said integrated housing; and
    a complete alphanumeric keyboard having keys to form a unitary keyboard structure laid out in QWERTY style, keys of said keyboard being organized into three rows of letter keys, an upper row of letter keys spanning both left hand and right hand sides of the front surface of said integrated housing, the letter keys in an upper row disposed such that five letter keys of the upper row are disposed on each side of a vertical reference line, the keys in a middle row disposed such that five letter keys are disposed on one side of the vertical reference line and four letter keys are disposed on the other side of the vertical reference line, and the keys in a lower row disposed such that four letter keys are disposed on the one side of the vertical reference line and three letter keys are disposed on the other side of the vertical reference line.

2. The apparatus of claim 1, wherein the integrated device housing the device has a generally rectangular shape and wherein the front surface is substantially planar and wherein the keys of QWERTY style keyboard extend through the front surface.

3. The apparatus of claim 2, wherein the integrated device housing comprises side surfaces that connect the front surface to the rear surface.

4. The apparatus of claim 3, wherein the microphone is positioned on the bottom side surface of the device housing.

5. The apparatus of claim 1, wherein the microphone is positioned below the QWERTY keyboard.

6. The apparatus of claim 1, wherein the speaker, display, QWERTY keyboard, and microphone are each aligned along the major axis defined through the device housing.

7. The apparatus of claim 1, wherein the display and the QWERTY keyboard are aligned along the major axis defined through the device housing, and wherein the speaker and microphone are offset from the vertical reference line.

8. The apparatus of claim 1, wherein the display is rectangular.

9. The apparatus of claim 1, wherein the QWERTY keyboard includes the letter keys, a plurality of function keys and a space bar key.

10. The apparatus of claim 9, wherein the plurality of function keys include a backspace key, an enter key and a delete key.

11. The apparatus of claim 9, wherein the QWERTY keyboard further includes a NUM lock key and a CAP lock key, wherein the NUM lock key and the CAP lock key are positioned on either side of the space bar key.

12. The apparatus of claim 9, wherein each key in each row of keys is horizontally aligned across a front surface of the device housing with the other keys in the row of keys.

13. The apparatus of claim 9, wherein the keys in each row of keys are configured along an arc across a front surface of the device housing.

14. The apparatus of claim 13, wherein the arc is convex.

15. The apparatus of claim 13, wherein the arc is concave.

16. The apparatus of claim 9, wherein the letter keys on the left hand side of the device housing are tilted at a negative angle with respect to the vertical reference line and the letter keys on the right hand side of the device housing are tilted at a positive angle with respect to the vertical reference line.

17. The apparatus of claim 16, wherein each key on the left hand side is tilted at a common negative angle with respect to the vertical reference line and wherein each key on the right hand side is tilted at a common positive angle with respect to the vertical reference line.

18. The apparatus of claim 17, wherein the common negative angle and the common positive angle are complementary angles.

19. The apparatus of claim 16, wherein the letter keys are oblong shaped.

20. The apparatus of claim 19, wherein the oblong shaped letter keys are oval shaped.

21. The apparatus of claim 19, wherein the oblong shaped keys are rectangular shaped.

22. The apparatus of claim 19, wherein the oblong shaped keys are diamond shaped.

23. The apparatus of claim 16, wherein the plurality of letter keys are symmetrically shaped.

24. The apparatus of claim 23, wherein the letter keys are square shaped.

25. The apparatus of claim 23, wherein the letter keys are circular shaped.

26. The apparatus of claim 1, further comprising a serial port mounted along a side surface of the device housing.

27. The apparatus of claim 1, further comprising at least one auxiliary input/output device mounted along a side surface of the device housing.

28. The apparatus of claim 27, wherein the auxiliary input/output device is a thumbwheel.

29. The apparatus of claim 27, wherein the auxiliary input/output device is a LED.

30. The apparatus of claim 1, further comprising:
a microprocessor, coupled to the transceiver, the display, the QWERTY keyboard, the microphone and the speaker, for controlling the operation of the device.

31. The apparatus of claim 30, further comprising:
a memory store for storing an operating system and one or more application programs that are executed by the microprocessor, the one or more application programs including at least a voice communication module and a data communication module;
wherein the voice communication module controls the voice communication interface when the device is in a voice mode of operation and the data communication module controls the data communication interface when the device is in a data mode of operation.

32. The apparatus of claim 31, wherein the one or more application programs further include a personal information manager application program.

33. The apparatus of claim 1, further comprising a transceiver for sending and receiving voice communications.

34. The apparatus of claim 1, further comprising a transceiver that includes at least one antenna, a transmitter and a receiver coupled to the at least one antenna, and a digital signal processor for communicating with the transmitter and the receiver.

35. The apparatus of claim 1, further comprising a short range RF communications system.

36. The apparatus of claim 1, further comprising a transceiver that sends and receives voice communications to and from a wireless voice network and wherein the transceiver sends and receives data communications to and from a wireless data network.

37. The apparatus of claim 1, wherein the integrated device housing includes a front surface, a rear surface, and a plurality of side surfaces that couple the front surface to the rear surface.

38. The apparatus of claim 37, wherein the QWERTY keyboard is symmetrically positioned between the left hand and right hand sides of the front surface.

39. The apparatus of claim 37, further comprising a thumbwheel input device mounted within a side surface adjacent to the display.

40. The apparatus of claim 37, further comprising a thumbwheel input device mounted within the front surface.

41. The apparatus of claim 37, wherein the integrated device housing comprises two separate device housing sections coupled together to form the single, integrated device housing.

42. The apparatus of claim 41, wherein the two separate device housing sections are coupled together using a plurality of fasteners.

43. The apparatus of claim 42, further comprising a single circuit board for mounting the display, keyboard and speaker, the single circuit board being positioned within the two separate device housing sections and maintained in place using the plurality of fasteners.

44. The apparatus of claim 1, further comprising:
an infrared data port for wireless transmitting and receiving data with another mobile communication device having a similar infrared data port.

45. The apparatus of claim 1, further comprising:
a mode key for switching the device between a voice mode of operation and a data mode of operation.

46. The apparatus of claim 1, further comprising:
a personal information manager (PIM) interface comprising the display, the QWERTY keyboard, and a PIM application program for operating the device in a PIM mode of operation.

47. The apparatus of claim 46, wherein the PIM application is configured to generate and store a plurality of PIM data items in a PIM database stored on the dual mode mobile communication device, the PIM data items including calendar data items, appointment data items and/or task data items.

48. The apparatus of claim 46, wherein the PIM application is configured to manage and process received voice calls and voice messages at the dual mode mobile communication device.

49. The apparatus of claim 46, wherein the PIM application is configured to manage and process received data messages and to store the data messages in the PIM database on the dual mode mobile communication device.

50. The apparatus of claim 46, further comprising a serial port for interfacing the dual mode mobile communication device to a host computer system.

51. The apparatus of claim 50, wherein the serial port is used to synchronize data stored within the dual mode mobile communication device with data stored at the host computer system.

52. The apparatus of claim 51, wherein the data stored within the dual mode mobile communication device may be synchronized with the data stored at the host computer system over a wireless network in addition to being synchronized using the serial port.

53. The apparatus of claim 50, wherein the serial port is used to configure the operation of the device via a software application operating on the host computer.

54. The apparatus of claim 50, wherein the serial port is used to load application programs from the host system to the dual mode mobile communication device.

55. The apparatus of claim 50, wherein the serial port is used to load an encryption key from the host system to the dual mode mobile communication device to facilitate secure data communications via the data communication interface.

56. A handheld dual mode device capable of voice communication and data communication, said dual-mode device comprising:
an integrated device housing having a front surface within which are mounted, and through which extend, a display and one, complete-alphanumeric keyboard having keys to form a unitary keyboard structure laid out in the QWERTY style, keys of said keyboard being organized into three rows of letter keys, an upper row of letter keys spanning both left hand and right hand sides of the front surface of said integrated housing, the letter keys in an upper row disposed such that five letter keys of the upper row are disposed on each side of a vertical reference line, the keys in a middle row disposed such that five letter keys are disposed on one side of the vertical reference line and four letter keys are disposed on the other side of the vertical reference line, and the keys in a lower row disposed such that four letter keys are disposed on the one side of the vertical reference line and three letter keys are disposed on the other side of the vertical reference line, said keyboard being located adjacent to, and below, the display, said front surface including therein a speaker that is located above the display and a microphone that is also located below the complete, alphanumeric QWERTY-style keyboard, said housing also having and having a longer dimension and a shorter dimension, the longer dimension defining a major axis.

57. The handheld dual mode device of claim 56 wherein the keys in each row configured along an arc across a front surface of the device housing.

58. The handheld dual mode device of claim 56 further comprising a speaker, mounted above said display.

59. The handheld dual mode device of claim 58 further comprising a microphone mounted at the front surface of said device housing, permitting use by the user pursuant to the voice communication and the data communication while maintaining the device housing in a common orientation.

* * * * *